United States Patent
De Titta et al.

(10) Patent No.: US 11,109,454 B2
(45) Date of Patent: Aug. 31, 2021

(54) WAVEGUIDE FOR MICROWAVE OVENS WITH MULTIPLE FEEDING PORTS RF POWER CONTROL SYSTEM AND METHOD THEREOF

(71) Applicants: WHIRLPOOL CORPORATION, Benton Harbor, MI (US); PANASONIC CORPORATION, Kadoma (JP)

(72) Inventors: Edoardo De Titta, Rome (IT); Giovanni Dore, Arezzo (IT); Nelson Rene Garcia-Polanco, Besozzo (IT)

(73) Assignee: Whirlpool Corporation, Benton Harbor, MI (US)

( * ) Notice: Subject to any disclaimer, the term of this patent is extended or adjusted under 35 U.S.C. 154(b) by 259 days.

(21) Appl. No.: 16/307,107

(22) PCT Filed: Nov. 18, 2016

(86) PCT No.: PCT/US2016/062698
§ 371 (c)(1),
(2) Date: Dec. 4, 2018

(87) PCT Pub. No.: WO2018/093376
PCT Pub. Date: May 24, 2018

(65) Prior Publication Data
US 2019/0230751 A1   Jul. 25, 2019

(51) Int. Cl.
*H05B 6/68* (2006.01)
*H05B 6/64* (2006.01)
(Continued)

(52) U.S. Cl.
CPC ........... *H05B 6/687* (2013.01); *H05B 6/6485* (2013.01); *H05B 6/668* (2013.01); *H05B 6/70* (2013.01); *H05B 6/705* (2013.01); *H05B 6/707* (2013.01)

(58) Field of Classification Search
CPC .......... H05B 6/70; H05B 6/707; H05B 6/705; H05B 6/6485; H05B 6/687; H05B 6/668; Y02B 40/00
(Continued)

(56) References Cited

U.S. PATENT DOCUMENTS

| 4,427,867 A | 1/1984 | Dills |
| 4,940,867 A * | 7/1990 | Peleg ................. B65D 81/3453 |
| | | 219/730 |

(Continued)

FOREIGN PATENT DOCUMENTS

| EP | 0632678 A1 | 1/1995 |
| EP | 1619933 A1 | 1/2006 |

(Continued)

*Primary Examiner* — Quang T Van
(74) *Attorney, Agent, or Firm* — Price Heneveld LLP (57) ABSTRACT

An electromagnetic cooking device includes a heating cavity and at least one electromagnetic energy source configured to generate radiation in communication with the heating cavity via a supply cavity. The cooking apparatus further includes a first port configured to emit the radiation into a first region of the heating cavity from the supply cavity and a second port configured to emit the radiation into a second region of the heating cavity from the supply cavity. A septum is disposed along the supply cavity. The septum is configured to adjust a proportion of the radiation emitted from the first port and the second port into the heating cavity.

18 Claims, 6 Drawing Sheets

(51) Int. Cl.
*H05B 6/70* (2006.01)
*H05B 6/66* (2006.01)

(58) Field of Classification Search
USPC ....... 219/696, 693, 697, 702, 704, 730, 746, 219/748, 751, 754, 756, 761; 156/345.36; 118/723 ME, 723 MR, 118/723 MW
See application file for complete search history.

(56) References Cited

U.S. PATENT DOCUMENTS

| | | | |
|---|---|---|---|
| 5,094,865 | A | 3/1992 | Levinson |
| 7,992,552 | B2 | 8/2011 | Hirano et al. |
| 9,035,224 | B2 | 5/2015 | Lim et al. |
| 2008/0105675 | A1 | 5/2008 | Choi et al. |
| 2010/0176123 | A1* | 7/2010 | Mihara ................. H05B 6/686 219/746 |
| 2012/0097667 | A1* | 4/2012 | Niklasson ............. H05B 6/682 219/702 |
| 2012/0152938 | A1* | 6/2012 | Nordh ................... H05B 6/705 219/702 |
| 2016/0073453 | A1 | 3/2016 | Hyde et al. |

FOREIGN PATENT DOCUMENTS

| | | |
|---|---|---|
| EP | 2306785 A1 | 4/2011 |
| EP | 2605617 A1 | 6/2013 |
| WO | 2012052894 A1 | 4/2012 |
| WO | 2015127999 A1 | 9/2015 |

\* cited by examiner

WAVEGUIDE FOR MICROWAVE OVENS WITH MULTIPLE FEEDING PORTS RF POWER CONTROL SYSTEM AND METHOD THEREOF

TECHNOLOGICAL FIELD

The present device generally relates to a cooking appliance and more particularly relates to an electromagnetic cooking apparatus.

SUMMARY

In at least one aspect, an electromagnetic cooking device is disclosed. The cooking apparatus comprises a heating cavity and at least one electromagnetic energy source configured to generate radiation in communication with the heating cavity via a supply cavity. The cooking apparatus further comprises a first feeding port configured to emit the radiation into a first region of the heating cavity from the supply cavity and a second port configured to emit the radiation into a second region of the heating cavity from the supply cavity. A septum is disposed along the supply cavity. The septum is configured to adjust a proportion of the radiation emitted from the first port and the second port into the heating cavity.

In at least another aspect, an electromagnetic cooking device is disclosed. The device comprises a heating cavity and at least one electromagnetic energy source configured to generate radiation in communication with the heating cavity via a supply cavity. The device further comprises a plurality of supply ports configured to emit the radiation into a first region and a second region of the heating cavity from the supply cavity. At least one septum is disposed along the supply cavity. The septum is configured to adjust a proportion of the radiation emitted from each of the supply ports into the heating cavity.

The cooking device further comprises a controller and at least one actuator. The at least one actuator is configured to adjust a position of the at least one septum to control the proportion of the radiation emitted from the first port and the second port. The controller is in communication with the actuator and the at least one electromagnetic energy source. The controller is configured to control the emission of the radiation from the at least one electromagnetic energy source and control the position of the actuator thereby adjusting a proportion of the radiation emitted from each of the ports.

In at least another aspect, a method of controlling a distribution of electromagnetic energy in a heating cavity is disclosed. The method comprises generating an amplified signal corresponding to electromagnetic radiation and emitting the radiation into a supply cavity. The method further comprises controlling an actuator in connection with a septum thereby positioning the septum in a first position. The radiation is emitted from a first port of the supply cavity in response to the septum arranged in the first position. The method further comprises controlling the actuator in connection with the septum thereby positioning the septum in a second position. The radiation is emitted from a second port of the supply cavity in response to the septum arranged in the second position.

These and other features, advantages, and objects of the present device will be further understood and appreciated by those skilled in the art upon studying the following specification, claims, and appended drawings.

DETAILED DESCRIPTION OF EMBODIMENTS

Figure 1:
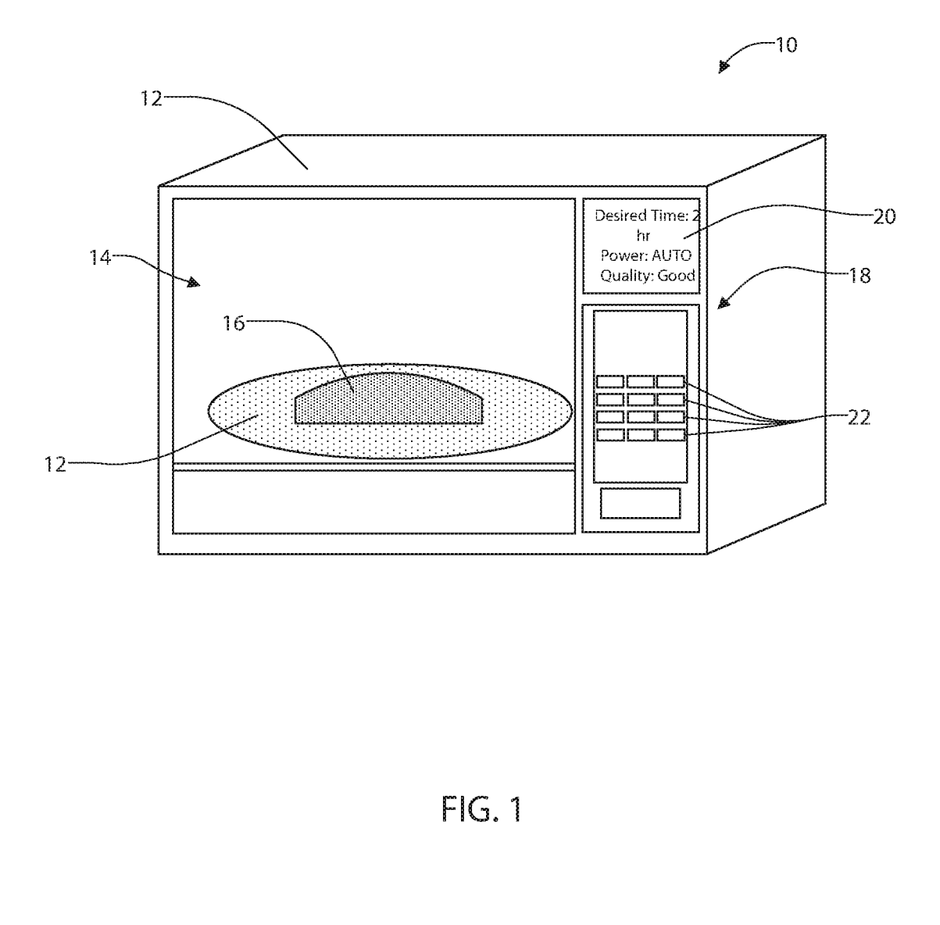
FIG. 1 is a diagram of a cooking appliance.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the embodiment illustrated in FIG. 1, a cooking appliance 10 is shown. The cooking appliance 10 may comprise a crisp plate 12 disposed in a heating cavity 14. The crisp plate 12 may be configured to heat in response to electromagnetic radiation generated by an electromagnetic generator of the cooking appliance. For example, the crisping plate 12 may comprise a ferrite composition configured to generate heat energy in response to electromagnetic energy received from the electromagnetic generator. In this configuration, the cooking appliance 10 may be operable to heat the crisp plate 12 to improve or adjust a cooking process of a food load 16 as further discussed herein.

The crisp plate 12 may correspond to a sheet, platter, container, or various structures configured to receive or support the food load 16. In an exemplary embodiment, the crisp plate 12 may comprise a ferrite material configured to absorb electromagnetic radiation or microwaves generated by the electromagnetic energy in the heating cavity 14. The crisp plate 12 may be formed of a plurality of layers and/or materials to suit a particular application. In some embodiments, the ferrite material may be distributed in a carrier material configured to provide a desired absorption of the radiation in the heating cavity 14. In some embodiments, the cooking appliance 10 may be operable to control a distribution of the electromagnetic radiation delivered to the heating cavity 14 to control the energy delivered to the crisp plate 12 as well as the energy delivered to the food load 16.

The cooking appliance 10 may comprise an interface 18. The interface 18 may correspond to a human machine interface (HMI) or various forms of control inputs. In an exemplary embodiment, the interface 18 may comprise a display screen 20 configured to communicate one or more messages or graphics to assist in operation of the cooking appliance 10. Additionally, the interface 18 may comprise one or more configurable inputs 22 operable to receive various selections to control the operation of the cooking appliance 10. In an exemplary embodiment, the display screen 20 may correspond to a touch-screen interface configured to integrate one or more of the inputs 22 as soft-keys or programmable inputs. Accordingly, the cooking appliance 10 may be configured in a variety of ways to suit a desired application.

In an exemplary embodiment, the cooking appliance 10 may correspond to a solid-state radio frequency (RF) cooking appliance configured to heat the food load 16 by introducing electromagnetic radiation into the heating cavity 14. The radiation may correspond to one or more RF signals emitted into the heating cavity from one or more ports located at different locations in the cavity 14. In this configuration, the cooking appliance 10 may be operable to control the distribution of electromagnetic energy within the cavity. In some embodiments, a plurality of RF signals may be introduced into the heating cavity 14 at a variety of frequencies, amplitudes, and/or different offset phases with respect to each of the RF signals. Other electromagnetic characteristics can be common among the RF feeds. Although the following embodiments are directed to a cooking appliance where RF feeds direct electromagnetic radiation to heat the food load 16 in the heating cavity 14, it will be understood that the methods described herein and the inventive concepts derived herefrom are not so limited. The covered concepts and methods are applicable to any RF device where electromagnetic radiation is directed to an enclosed cavity to act on an object inside the cavity. Exemplary devices include ovens, dryers, steamers, and the like.

Figure 2:
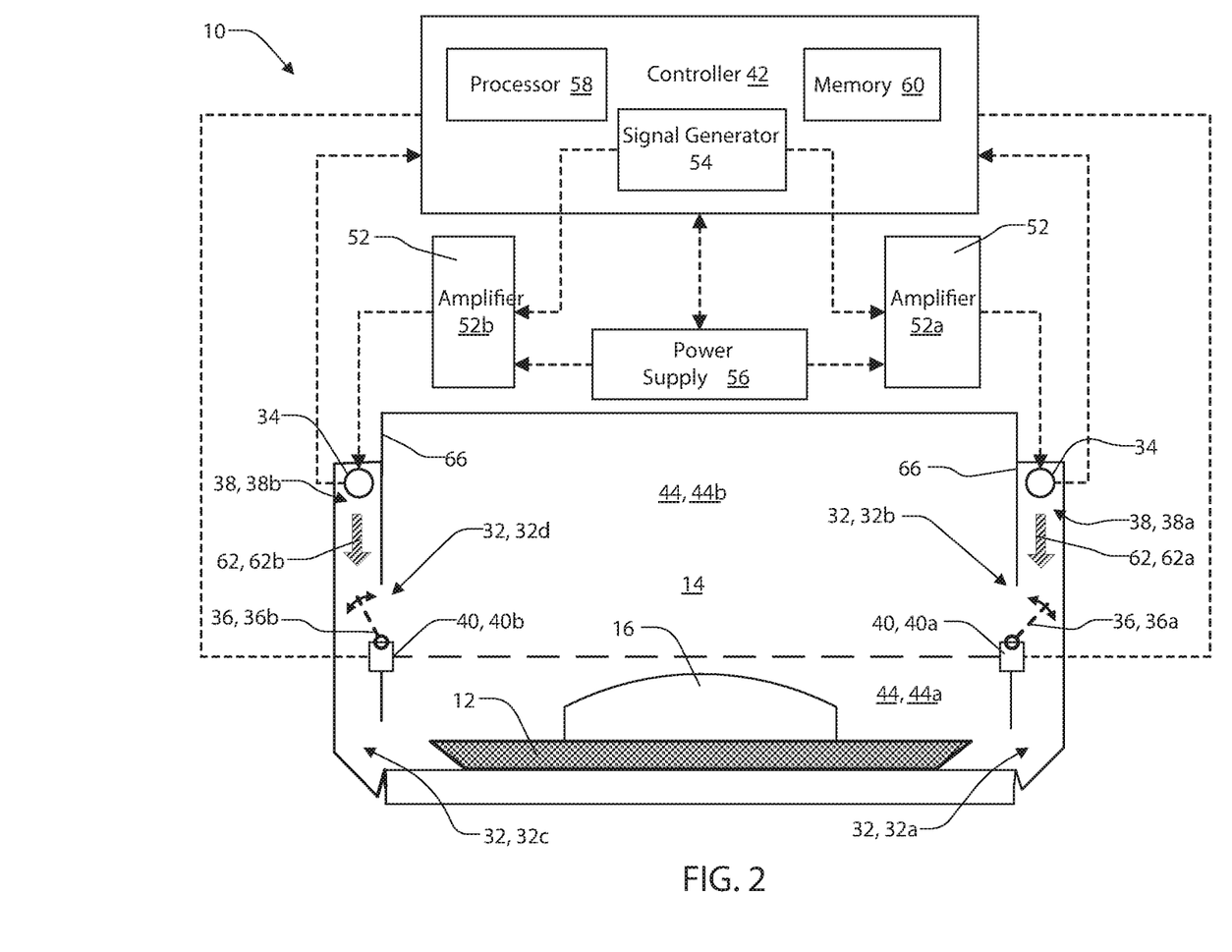
FIG. 2 is a schematic diagram of a cooking appliance demonstrating a septum.

Referring now to FIG. 2, a schematic diagram of the cooking appliance 10 is shown. As discussed previously, the cooking appliance 10 may be configured to control a distribution of the electromagnetic energy in the heating cavity 14. In order to control the distribution of electromagnetic energy, the cooking appliance 10 may comprise a plurality of emission ports 32. The emission ports 32 may be configured to direct the electromagnetic radiation from at least one waveguide or antenna 34 into the heating cavity 14. Though four emission ports are demonstrated and discussed in reference to exemplary embodiments, the number of emission ports 32 and septa may vary based on a particular configuration of the appliance 10.

In some embodiments, the appliance 10 may comprise at least one septum 36, baffle or partition. A position or orientation of the septum 36 a supply cavity 38 may be controlled by an actuator 40 in communication with a controller 42 of the appliance 10. The controller 42 may correspond to one or more circuits or processors configured to control operations of the appliance 10. In this configuration, the controller 42 may be configured to adjust the septum 36 to direct electromagnetic energy from the antenna 34 into a desired region of a plurality of regions 44 of the heating cavity 14.

For example, the controller 42 may be configured to selectively direct all or part of the electromagnetic energy into the heating cavity 14 via a first port 32a or a second port 32b. In this configuration, the controller 42 of the appliance 10 may adjust the septum 36 to control the distribution of the electromagnetic energy in the heating cavity between a first region 44a and a second region 44b of the heating cavity 14. The first region 44a may correspond to a lower region corresponding to a region wherein the crisp plate 12 is located. The second region 44b may correspond to an upper region disposed further from the crisp plate 12 than the first region 44a. In this configuration, the controller 42 may adjust the septum 36 to control the distribution of the electromagnetic radiation between the first region 44a and the second region 44b. Further details regarding the septum 36, the regions 44 and the corresponding operation of the cooking appliance 10 are further discussed in reference to FIGS. 3A and 3B.

The at least one waveguide or antenna 34 may be supplied wave patterns from at least one amplifier 52 in communication with a signal generator 54. The amplifier 52 may be communicatively coupled to the signal generator 54 and configured to adjust a level of a control signal from a low level (e.g. 1-12 volts) to a high level (e.g. 12-50 volts). In this way, the amplifier 52 may receive a control signal from the signal generator 54 and convert the control signal to an amplified output signal comprising electromagnetic energy configured to transmit energy into the heating cavity 14. The amplification of the magnitude of the control signal may be provided by a power supply 56 of the amplifier 52. In some embodiments, the amplifier 52 may be configured to output an RF signal ranging from 50 to 350 Watts. The maximum output wattage for each of the amplifiers 52 may be more or less than 350 Watts depending upon the implementation.

The power supply 56 may provide electrical power derived from mains electricity to the controller 42, the signal generator 54, the interface 18 and the at least one amplifier 52. The power supply 56 may be configured to convert the mains electricity to the required power level of each of the devices it powers. In some embodiments, the power supply 56 may deliver a variable output voltage level to the amplifier 52. For example, the power supply 56 may output a voltage level selectively controlled in 0.5-Volt steps to the amplifier 52. In this way, the power supply 56 may be configured to control a magnitude of the amplified output signal transmitted from the amplifier to the antenna 34 or waveguide. In an exemplary embodiment, the controller 42 may adjust the voltage of from the power supply 56 to the amplifier to various levels (e.g. 5V-60V) depending on a desired application and wattage of the output signal.

The controller 42 may comprise a processor 58 (e.g. a processor, microcontroller, etc.) and a memory 60. The memory 60 may be utilized to store control software that can be executed by the processor 58 to control a cooking cycle. For example, the memory 60 may be configured to store one or more pre-programmed cooking cycles that may be selected via the interface 18. In this configuration, the controller 42 may be operable to control one or more control signals generated by the signal generator 54 to adjust a frequency and/or phase of the amplified output signal 62 from the at least one amplifier 52. The amplifier 52 may correspond to a transistor including, but not limited to a laterally diffused metal oxide semiconductor (LDMOS), a power metal oxide semiconductor field-effect transistor (MOSFET), and other suitable devices.

Based on the one or more control signals from the signal generator 54, the amplified output signal 62 transmitted from the amplifier 52 to the antenna 34 may be transmitted over a wide range of RF bands. The transmitted bandwidth of the amplified output signal may include frequencies ranging from 2.4 GHz to 2.5 GHz. In some embodiments, the amplified output signal 62 may be configured to transmit other RF bands. For example, the bandwidth of frequencies between 2.4 GHz and 2.5 GHz is one of several bands that make up the industrial, scientific and medical (ISM) radio bands. The transmission of other RF bands is contemplated and can include non-limiting examples contained in the ISM bands defined by the frequencies: 13.553 MHz to 13.567 MHz, 26.957 MHz to 27.283 MHz, 902 MHz to 928 MHz, 5.725 GHz to 5.875 GHz and 24 GHz to 24.250 GHz.

In some embodiments, the cooking appliance 10 may comprise a plurality of amplifiers 52. The plurality of amplifiers may correspond to a first amplifier 52a and a second amplifier 52b. The first amplifier 52a may be configured to deliver a first amplified output signal 62a to a first supply cavity 38a. The first supply cavity 38a may be configured to direct the first amplified output signal 62a toward a first septum 36a. The controller 42 may selectively position the first septum 36a to direct the first amplified output signal 62a into the heating cavity 14 via the via the first port 32a, the second port 32b, or a combination of the ports 32. In this configuration, the controller 42 may direct the focus of the first amplified output signal 62a to adjust the distribution of the electromagnetic energy delivered into the heating cavity 14 between the first region 44a and the second region 44b.

The second amplifier 52b may be configured to deliver a second amplified output signal 62b to a second supply cavity 38b. The second supply cavity 38b may be configured to direct the second amplified output signal 62b toward a second septum 36b. The controller 42 may selectively position the second septum 36b to direct the second amplified output signal 62b into the heating cavity 14 via the via the third port 32c, the fourth port 32d, or a combination of the ports 32. In this configuration, the controller 42 may direct the focus of the second amplified output signal 62b to adjust the distribution of the electromagnetic energy delivered into the heating cavity 14 between the first region 44a and the second region 44b.

The controller 42 may control each of the first septum 36a and the second septum 36b together or independently to provide a uniform or variable distribution of the first amplified output signal 62a and the second amplified output signal 62b in the first region 44a and/or the second region 44b. The septum(s) 36 may be adjusted between a first position and a second position (See FIGS. 3A-3C) by an actuator 40 in communication with the controller 42. In this configuration, the controller 42 may adjust the position or orientation of the septum 36 by selectively adjusting the position of the actuator 40 to control the septum 36. In this way, the distribution of the electromagnetic energy transmitted into the heating cavity 14 may be adjusted to focus on the first region 44a, the second region 44b, or a combination thereof.

The actuators 40 associated with the one or more septa 36 may correspond to various types of mechanical or electro-mechanical devices. For example, the actuator 40 may correspond to a direct current motor, stepper motor, servo-motor, solenoid, etc. The controller 42 may supply a signal to the motor or a motor controller to position the septum 36. In this way, the controller 42 may selectively position the septum 36 to control distribution of the electromagnetic energy in the heating cavity 14.

The supply cavity 38 may be configured to transmit the amplified output signal 62 through a passage configured to direct the electromagnetic energy to each of the ports 32. By controlling the position of the septum 36 via the actuator 40, the controller 42 may control a proportion of the radiation from the antenna 34 or waveguide emitted from each of the ports 32. The supply cavity 38 may be configured to transmit the electromagnetic energy along a perimeter wall 66 of the heating cavity 14. In this configuration, the septum 36 may be configured to substantially block the second port 32b in the first position 76 and an internal passage formed by the supply cavity 38 in the second position 86. In this way, the controller 42 may control the position of the septum 36 to selectively control a proportion of the electromagnetic energy emitted from each of the ports 32 corresponding to the supply cavity 38.

Figure 3A:
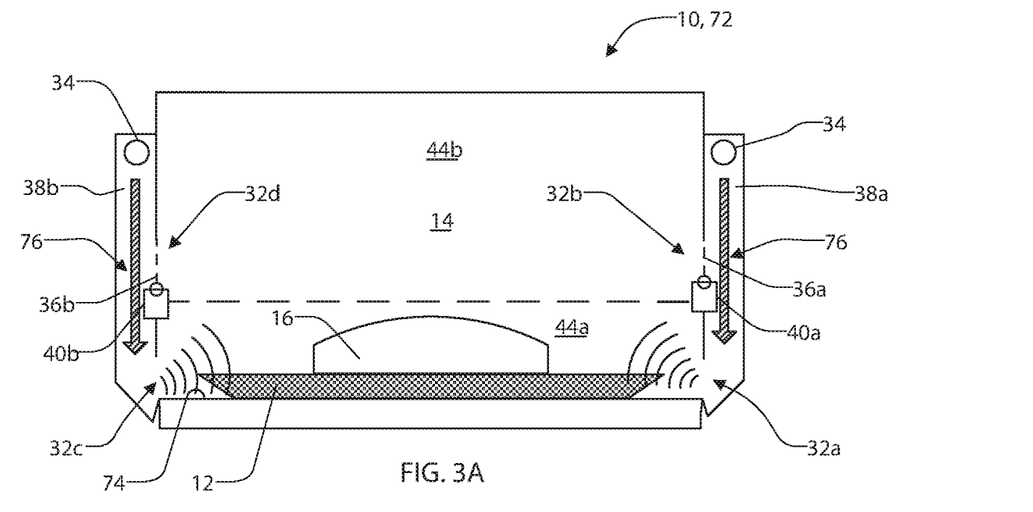
FIG. 3A is a schematic diagram of a cooking appliance demonstrating a first configuration.
Figure 3B:
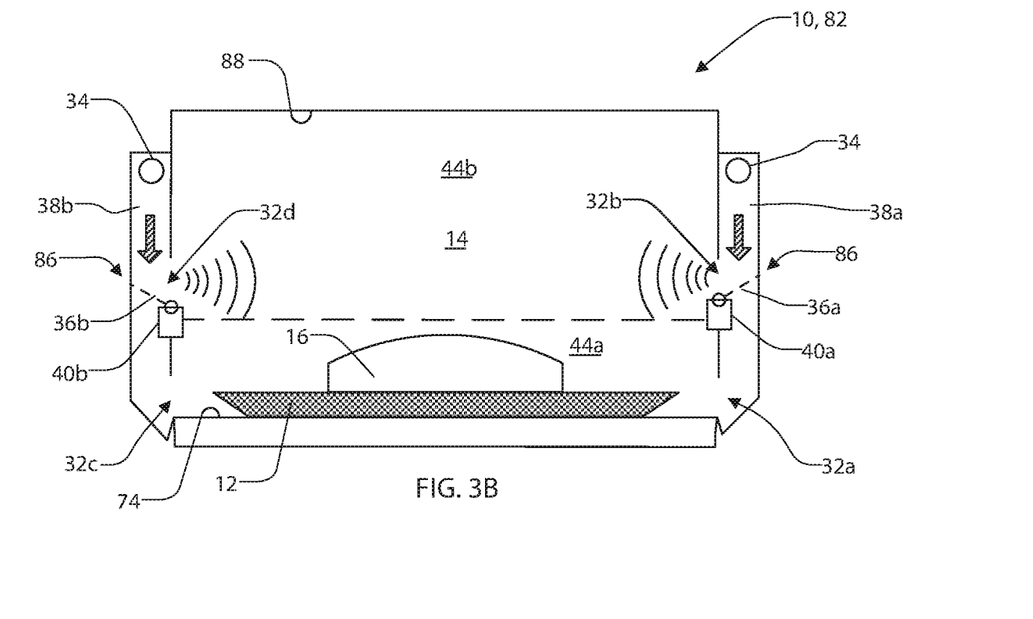
FIG. 3B is a schematic diagram of a cooking appliance demonstrating a second configuration.
Figure 3C:
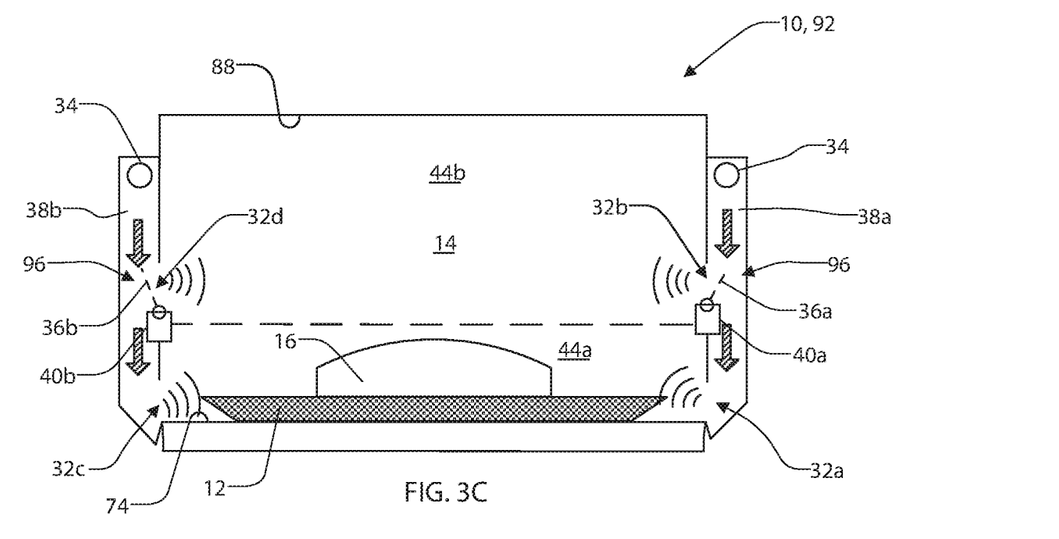
FIG. 3C is a schematic diagram of a cooking appliance demonstrating a third configuration.

Referring now to FIGS. 3A, 3B, and 3C; schematic diagrams of the cooking appliance 10 are shown demonstrating some configurations of the septa 36. Each of the configurations may provide for a different distribution of the electromagnetic energy generated by the cooking appliance 10. Though demonstrated in reference to the first septum 36a and the second septum 36b operating symmetrically, the controller 42 may be configured to adjust each of the septa 36 independently. Additionally, depending on the application, the cooking appliance 10 may comprise only a single amplifier 52 and septum 36 that may adjust the electromagnetic energy between a first port 32a and a second port 32b. In additional embodiments, the appliance 10 may comprise a plurality of amplifiers, septa, and ports (e.g. four amplifiers, four septa, and eight ports). In this way, the disclosure provides for a flexible assembly that may be configured to suit a variety of applications.

Referring to FIG. 3A, the cooking appliance 10 is demonstrated in a first configuration 72, wherein the controller 42 has positioned the first actuator 40a and the second actuator 40b to focus the electromagnetic energy from each of the amplifiers 52 on the first region 44a. In this configuration, the electromagnetic energy may enter the heating cavity 14 proximate a floor 74 of the heating cavity 14 via the first port 32a and/or the third port 32c. The electromagnetic energy may be focused on the crisp plate 12. Accordingly, the ferrite material of the crisp plate 12 may receive and absorb an increased proportion of the electromagnetic energy and convert the energy to heat. In this way, the controller 42 may adjust the position of the at least one septum 36 to the first position 76 to increase a proportion of the electromagnetic energy and associated heat energy to perform a browning or crisping operation for the food load 16.

Referring to FIG. 3B, the cooking appliance 10 is demonstrated in a second configuration 82, wherein the controller 42 has positioned the first actuator 40a and the second actuator 40b to focus the electromagnetic energy from each of the amplifiers 52 on the second region 44b. In this configuration, the electromagnetic energy may enter the heating cavity 14 away from the floor 74. For example, the second configuration 82 may position the at least one septum 36 in the second position 86 such that the radiation is substantially emitted from the second port 32b, and/or the fourth port 32d. In this configuration, the radiation may be emitted into the heating cavity 14 proximate a ceiling 88 or in an intermediate position 96 between the floor 74 and the ceiling 88.

In the second configuration 82, the electromagnetic energy may be directed into the heating cavity 14 above the crisp plate 12. Accordingly, the distribution of the electromagnetic energy may be less intensely directed to the crisp plate 12 in the second configuration 82 than in the first configuration 72. In this way, the controller 42 may adjust the position of the at least one septum 36 to the second position 86 to decrease a proportion of the electromagnetic energy absorbed by the crisp plate 12 relative to the first configuration 72.

Referring to FIG. 3C, the cooking appliance 10 is demonstrated in a third configuration 92. In the third configuration, the controller 42 may control the first actuator 40a and the second actuator 40b to an intermediate position 96 between the first position 76 and the second position 86. In the third configuration 92, the electromagnetic energy from each of the amplifiers 52 may be distributed between the first region 44a and the second region 44b. Accordingly, the electromagnetic energy may be directed to be emitted from each of the ports 32 (e.g. 32a, 32b, 32c, 32d, etc.) to evenly or proportionally distribute the electromagnetic energy between the first region 44a and the second region 44b. In this way, the controller 42 may adjust the focus of the energy and heating in the heating cavity 14 between the first region 44a and the second region 44b.

Figure 4:
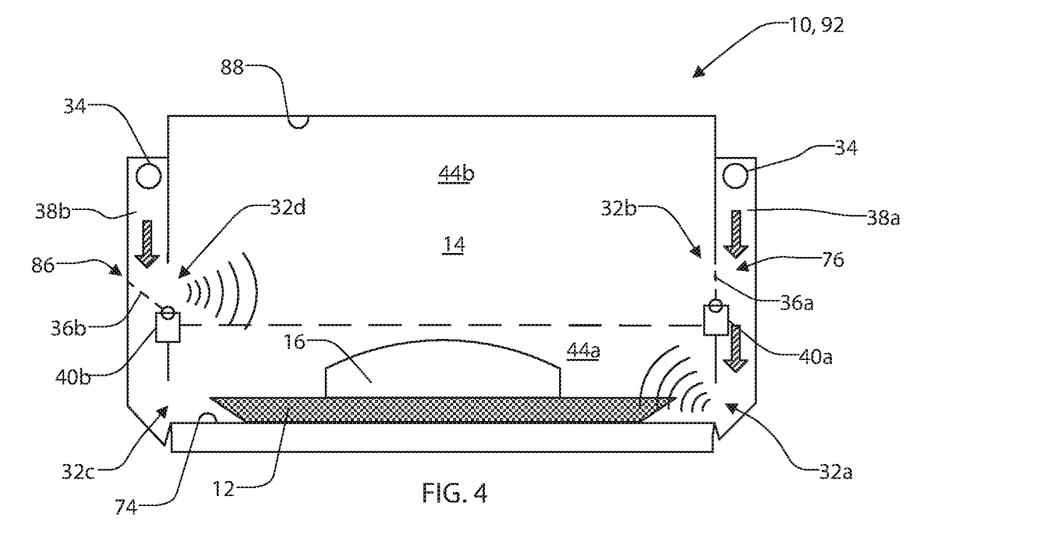
FIG. 4 is a schematic diagram of a cooking appliance demonstrating an operation configured to adjust the distribution of electromagnetic energy in a heating cavity over time.

Referring now to FIG. 4, in some embodiments, the controller 42 may be configured to adjust the position of the first septum 36a and the second septum 36b independently to adjust the distribution of the electromagnetic energy in the heating cavity 14. For example, the controller 42 may be configured to vary the position of the first septum 36a and the second septum 36b over time to change the distribution of the electromagnetic energy throughout a cooking process. In an exemplary embodiment, the controller 42 may adjust the first actuator 40a from the first position 76 to the second positon 86. At the same time, the controller 42 may adjust the second actuator 40b from the second position 86 to the first positon 76. This configuration may provide for a varied distribution of the electromagnetic energy in the heating cavity.

Over time, the controller 42 may adjust the first actuator 40a from the second position 86 to the first positon 76. During the same period, the controller 42 may adjust the second actuator 40b from the first position 76 to a second positon 86. In this way, the controller 42 may alternate the first septum 36a and the second septum 36b between the first position 76 and the second position 86 such that the electromagnetic energy emitted from the first amplifier 52a is output into the first region 44a while the electromagnetic energy emitted from the second amplifier 52b is output into the second region 44b and vice versa. Accordingly, the controller 42 may vary the distribution of the electromagnetic energy in the heating cavity 14 over time to adjust the heat distribution over time.

Figure 5:
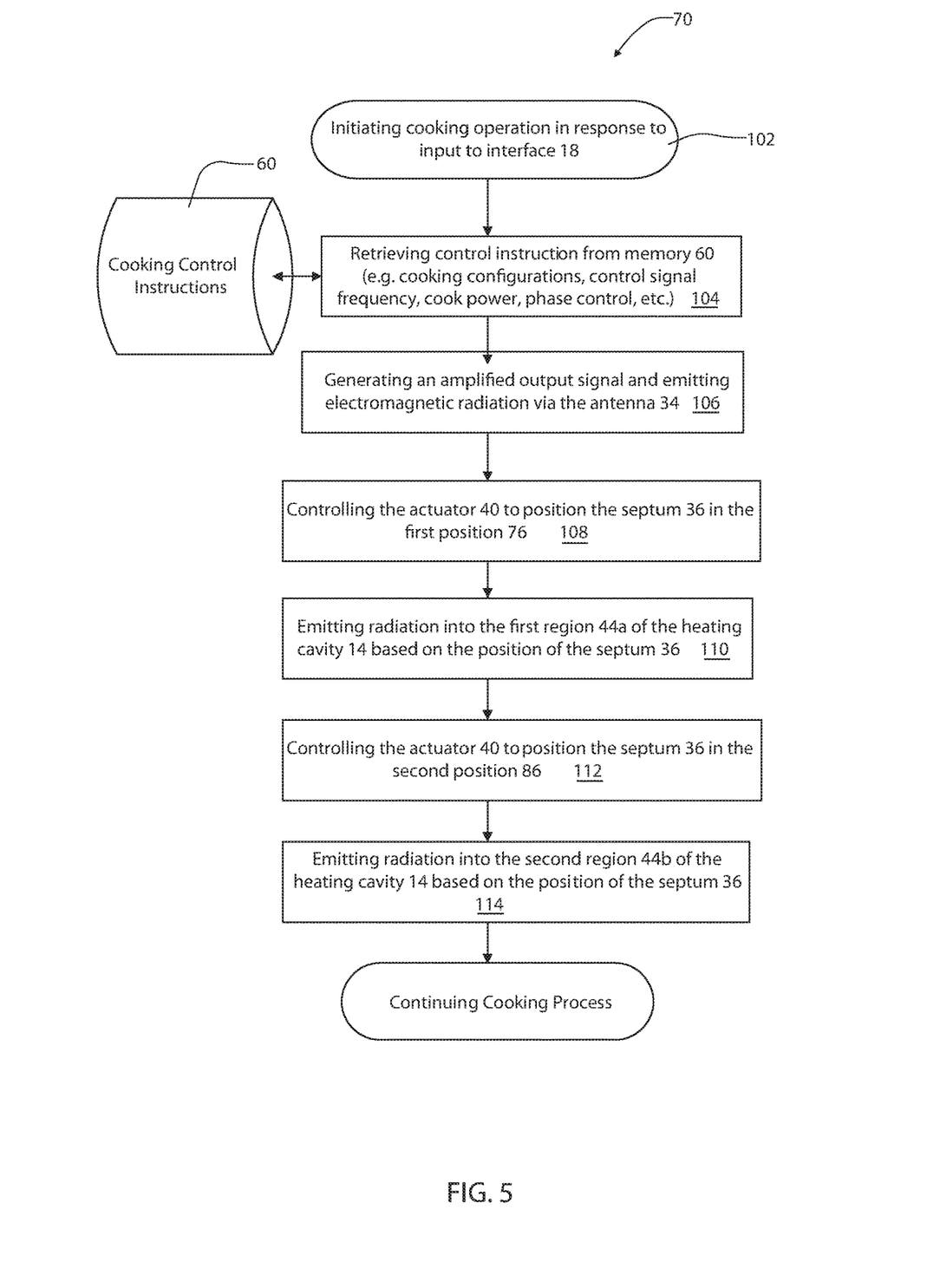
FIG. 5 is a flow chart demonstrating a method for a cooking routine for a cooking appliance.

Referring now to FIG. 5, a flow chart describing a method 100 for the control routine for the cooking appliance 10 is shown. The control routine may comprise a plurality of steps that may be completed by the controller 42 to perform a cooking operation. The cooking operation may be initiated in response to an input to the interface 18 (102). Once initiated, the controller 42 may retrieve a cooking routine for the cooking appliance 10 from the memory 60 (104). The cooking routine may comprise control instructions. For example, the control instructions may include a cooking configuration of the septa 36 and the actuators 40, a frequency and/or phase control of the control signal for the signal generator 54, a cooking power or amplification voltage of the power supply 56, etc.

With the control instructions from the memory 60, the controller 42 may generate an amplified output signal 62 via an antenna 34 or waveguide to emit electromagnetic radiation into the supply cavity 38 (106). The controller 42 may further control the actuator 40 to positon the septum 36 to achieve a configuration specified by the control instructions. As discussed herein, the cooking appliance 10 may comprise a plurality of outlet ports 32 configured to selectively direct the electromagnetic radiation into a first region 44a or a second region 44b of the heating cavity 14. Accordingly, the controller 42 may control the actuator 40 to position the septum 36 in the first position 76 (108). In the first position 76, radiation may be emitted into the first region 44a, which may correspond to a location of the crisp plate 12 (110).

The controller 42 may further control the actuator 40 to position the septum 36 in the second position 86 (112). In the second position 86, radiation may be emitted into the second region 44b (114). In this configuration, the radiation may be emitted into the heating cavity 14 above a food load 16 such that the radiation is absorbed more by the food load 16 than by the crisp plate 12. As discussed herein, the method 100 may provide for the selective distribution of electromagnetic radiation in a cooking cavity of a cooking appliance in accordance with the disclosure.

Figure 6:
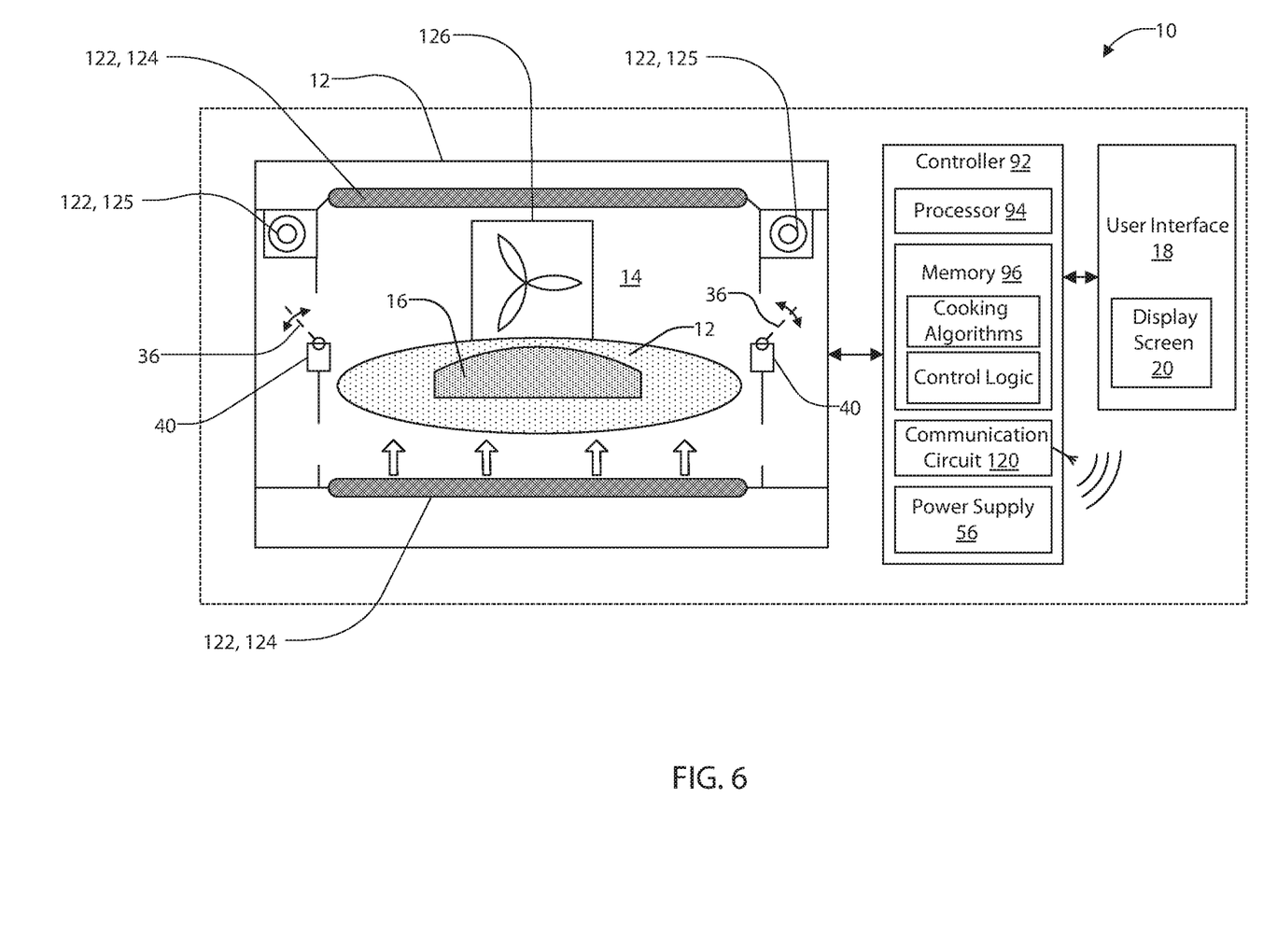
FIG. 6 is a block diagram of a cooking appliance in accordance with the disclosure.

Referring now to FIG. 6, a block diagram of the cooking appliance 10 is shown. As previously discussed, the cooking appliance 10 may comprise the controller 42, which may be configured to control various systems of the cooking appliance 10. The controller 42 may comprise the processor 58 and the memory 60. The processor 58 may correspond to one or more circuits and/or processors configured to communicate with the interface 18 and access the various cooking algorithms and control logic via the memory 60. In this configuration, the controller 42 may be operable to control one or more heating sources of the cooking appliance 10. The cooking algorithms and control logic stored in the memory 60 may include a wide variety of preconfigured heating distributions and associated positions of the septa 36 to provide for a variety of cooking results.

The cooking appliance 10 may be configured to adjust a distribution of electromagnetic energy emitted into the heating cavity 14 by adjusting a position of at least one septum 36. In an exemplary embodiment, the cooking appliance 10 may comprise a plurality of septa 36, each configured to direct electromagnetic energy from a plurality of ports 32. For example, controller 42 may control each of the first septum 36a and the second septum 36b together or independently to provide a uniform or variable distribution electromagnetic energy in the heating cavity 14. The controller 42 may control adjust the position or orientation of the septum 36 by selectively adjusting the position of the actuator 40.

The actuators 40 associated with the one or more septa 36 may correspond to various types of mechanical or electromechanical devices. For example, the actuator 40 may correspond to a direct current motor, stepper motor, servomotor, solenoid, etc. The controller 42 may supply a signal to the motor or a motor controller to position the septum 36. In this way, the controller 42 may selectively position the septum 36 to direct the electromagnetic energy into the heating cavity 14.

The interface 18 may correspond to a human machine interface (HMI) or various forms of control inputs. In an exemplary embodiment, the interface 18 may comprise a display screen 20 configured to communicate one or more messages or graphics to assist in operation of the cooking appliance 10. Additionally, the interface 18 may comprise one or more configurable inputs 22 operable to receive various selections to control the operation of the cooking appliance 10. In an exemplary embodiment, the display screen 20 may correspond to a touch-screen interface configured to integrate one or more of the inputs 22 as soft-keys or programmable inputs. Accordingly, the cooking appliance 10 may be configured in a variety of ways to suit various applications.

The controller 42, the amplifiers 52, and various additional electrical components discussed herein may be supplied electrical current by one or more power supplies (e.g. the power supply 56). The appliance 10 may further and may further comprise a communication circuit 120. The communication circuit 120 may correspond to various wired and/or wireless communication devices through which the controller 42 may communicate and/or access information stored in a remote server or location. For example, the communication circuit 120 may correspond to a local area network interface and/or a wireless communication interface. The wireless communication interface may be configured to communicate through various communication protocols including but not limited to wireless 3G, 4G, Wi-Fi®, Wi-Max®, CDMA, GSM, and/or any suitable wireless communication protocol. In this configuration, the controller 42 of the cooking appliance 10 may be configured to access information for a wide variety of cooking operations.

Though primarily discussed in reference to a microwave cooking apparatus, the cooking appliance 10 may comprise various forms of heat sources 122 including, but not limited to an electro-resistive heating element 124, one or more microwave elements 125 (e.g. the amplifier 52 and the antenna 34), a convection fan 126, or any mechanism suitable to heat food as discussed herein. As described, the disclosure may provide for various improvements for a cooking appliance 10 that may be implemented in a variety of devices without departing from the spirit of the disclosure. It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. An electromagnetic cooking device comprising:
   a heating cavity;
   at least one electromagnetic energy source configured to generate radiation in communication with the heating cavity via a supply cavity;
   a first port configured to emit the radiation into a first region of the heating cavity from the supply cavity;
   a second port configured to emit the radiation into a second region of the heating cavity from the supply cavity;
   a septum disposed along the supply cavity, wherein the septum is configured to adjust a proportion of the radiation emitted from the first port and the second port into the heating cavity; and
   an actuator in connection with the septum and configured to adjust the septum from a first position to a second position, wherein the septum encloses the second port in the first position and blocks a path to the first port in the second position, and wherein the septum blocks the radiation output from the second port in the first position and blocks the radiation delivered to the first port in the second position.

2. The electromagnetic cooking device according to claim 1, wherein the first port is located proximate a floor of the cavity.

3. The electromagnetic cooking device according to claim 2, wherein the second port is further from the floor than the first port.

4. The electromagnetic cooking device according to claim 1, wherein the first port and the second port are configured to emit the radiation from a perimeter wall of the heating cavity from the supply cavity.

5. The electromagnetic cooking device according to claim 1, further comprising:
   a cooking structure comprising a material configured to generate heat energy in response to the radiation.

6. The electromagnetic cooking device according to claim 5, wherein the cooking structure corresponds to a plate configured to rest on a floor of the heating cavity.

7. The electromagnetic cooking device according to claim 1, wherein the electromagnetic energy source corresponds to an amplifier configured to amplify a signal supplied by a signal generator.

8. The electromagnetic cooking device according to claim 1, further comprising:
a controller in communication with the electromagnetic energy source and configured to control at least one of a frequency, phase, and amplitude of the radiation.

9. An electromagnetic cooking device comprising:
a heating cavity;
at least one electromagnetic energy source configured to generate radiation in communication with the heating cavity via a supply cavity;
a plurality of supply ports configured to emit the radiation into a first region of the heating cavity via a first port and a second region of the heating cavity via a second port from the supply cavity;
at least one septum disposed along the supply cavity, wherein the septum is configured to adjust a proportion of the radiation emitted from each of the supply ports into the heating cavity;
at least one actuator configured to adjust a position of the at least one septum to control the proportion of the radiation emitted from the first port and the second port, wherein the at least one septum encloses the second port in the first position and blocks a path to the first port in the second position, and wherein the septum blocks the radiation output from the second port in the first position and blocks the radiation delivered to the first port in the second position; and
a controller in communication with the actuator and the at least one electromagnetic energy source, wherein the controller is configured to:
control the emission of the radiation from the at least one electromagnetic energy source; and
control the position of the actuator thereby adjusting a proportion of the radiation emitted from each of the ports.

10. The electromagnetic cooking device according to claim 9, wherein the first region corresponds to a lower region proximate a floor of the heating cavity.

11. The electromagnetic cooking device according to claim 10, wherein the second region corresponds to an upper region position further from the floor than the first region.

12. The electromagnetic cooking device according to claim 9, wherein the at least one electromagnetic energy source corresponds to a first energy source configured to emit radiation into a first supply cavity and a second energy source configured to emit radiation into a second supply cavity.

13. The electromagnetic cooking device according to claim 12, wherein the plurality of ports further comprise a third port and a fourth port configured to emit the radiation from the second supply cavity into the heating cavity.

14. The electromagnetic cooking device according to claim 13, wherein the at least one septum corresponds to a first septum configured to control a proportion of the radiation emitted between the first port and the second port, and a second septum configured to control a proportion of the radiation emitted between the third port and the fourth port.

15. A method of controlling a distribution of electromagnetic energy in a heating cavity, the method comprising:
generating an amplified signal corresponding to electromagnetic radiation;
emitting the radiation into a supply cavity;
controlling an actuator in connection with a septum thereby positioning the septum in a first position;
emitting the radiation from a first port of the supply cavity and enclosing a second port with the septum arranged in the first position, wherein the septum blocks the radiation output from the second port in the first position;
controlling the actuator in connection with the septum thereby positioning the septum in a second position; and
emitting the radiation from the second port of the supply cavity and blocking a path to the first port through the supply cavity with the septum arranged in the second position, wherein the septum blocks the radiation delivered to the first port in the second position.

16. The method according to claim 15, wherein controlling the actuator from the first position to the second position results in emitting the radiation into a first region of the heating cavity in the first position and a second region of the heating cavity in the second position.

17. The method according to claim 15, further comprising:
controlling a signal generator to adjust a frequency of a control signal; and
amplifying the control signal to form the amplified signal.

18. The method according to claim 17, further comprising:
controlling a supply voltage from a power supply thereby controlling an amplitude of the amplified signal.

* * * * *

UNITED STATES PATENT AND TRADEMARK OFFICE
CERTIFICATE OF CORRECTION

| | | |
|---|---|---|
| PATENT NO. | : 11,109,454 B2 | Page 1 of 1 |
| APPLICATION NO. | : 16/307107 | |
| DATED | : August 31, 2021 | |
| INVENTOR(S) | : De Titta et al. | |

It is certified that error appears in the above-identified patent and that said Letters Patent is hereby corrected as shown below:

On the Title Page

Item (71) Applicants:
WHIRLPOOL CORPORATION, Benton Harbor, MI (US);
PANASONIC CORPORATION, Kadoma (JP)

Should be:
WHIRLPOOL CORPORATION, Benton Harbor, MI (US)

Signed and Sealed this
Fifth Day of December, 2023

Katherine Kelly Vidal
*Director of the United States Patent and Trademark Office*